United States Patent [19]

Knapp

[11] Patent Number: 5,341,151
[45] Date of Patent: Aug. 23, 1994

[54] LIQUID CRYSTAL COLOUR DISPLAY DEVICE WITH ZIG-ZAG PATTERN

[75] Inventor: Alan Knapp, Crawley, England

[73] Assignee: U.S. Philips Corporation, New York, N.Y.

[21] Appl. No.: 957,296

[22] Filed: Oct. 6, 1992

[30] Foreign Application Priority Data

Oct. 18, 1991 [GB] United Kingdom ............. 9122173

[51] Int. Cl.$^5$ .............................................. G09G 3/30
[52] U.S. Cl. ............................................. 345/58; 345/88; 345/152
[58] Field of Search ................ 359/54, 59, 62, 64, 359/87; 340/719, 784; 118/624; 345/98, 99, 100, 88, 58, 152

[56] References Cited

U.S. PATENT DOCUMENTS

| | | |
|---|---|---|
| 4,223,308 | 9/1980 | Baraff et al. |
| 4,431,883 | 11/1983 | Baraff et al. |
| 4,804,951 | 2/1989 | Yamashita et al. ........... 359/54 |
| 4,836,650 | 6/1989 | Morin et al. ................ 359/62 |
| 4,908,609 | 3/1990 | Stroomer .................... 359/62 |
| 4,965,565 | 10/1990 | Noguchi .................... 359/59 |
| 4,986,637 | 1/1991 | Yamaguchi ................. 359/54 |
| 5,103,763 | 4/1992 | Goldowsky ................ 118/624 |

FOREIGN PATENT DOCUMENTS

0244013 11/1987 European Pat. Off.

OTHER PUBLICATIONS

"A 1-7M Pixel Full Colour Diode Driven AM-LCD" by M. Vijan et al, SID 90 Digest, pp. 530-533.

*Primary Examiner*—Alvin E. Oberley
*Assistant Examiner*—Steven J. Saras
*Attorney, Agent, or Firm*—John C. Fox; Norman N. Spain

[57] ABSTRACT

In a liquid crystal colour display device having a row and column array of red, green and blue picture elements (12) in which each column comprises picture elements of a respective colour and in which the picture elements are each associated with a switching element (14), e.g. a TFT or MIM, and are driven via sets of crossing address conductors (20,22) with each row of picture elements being connected with a conductor (22) of one set and each conductor of the other set being connected to one picture element in each row and in different columns, as in a so-called delta configuration display, each conductor (20) of the other set is arranged, for example in zig-zag fashion, so as to connect with picture elements in at least three, and preferably seven, successive columns. A reduction in vertical cross-talk effects is then obtained particularly when using preferred line inversion drive schemes.

15 Claims, 3 Drawing Sheets

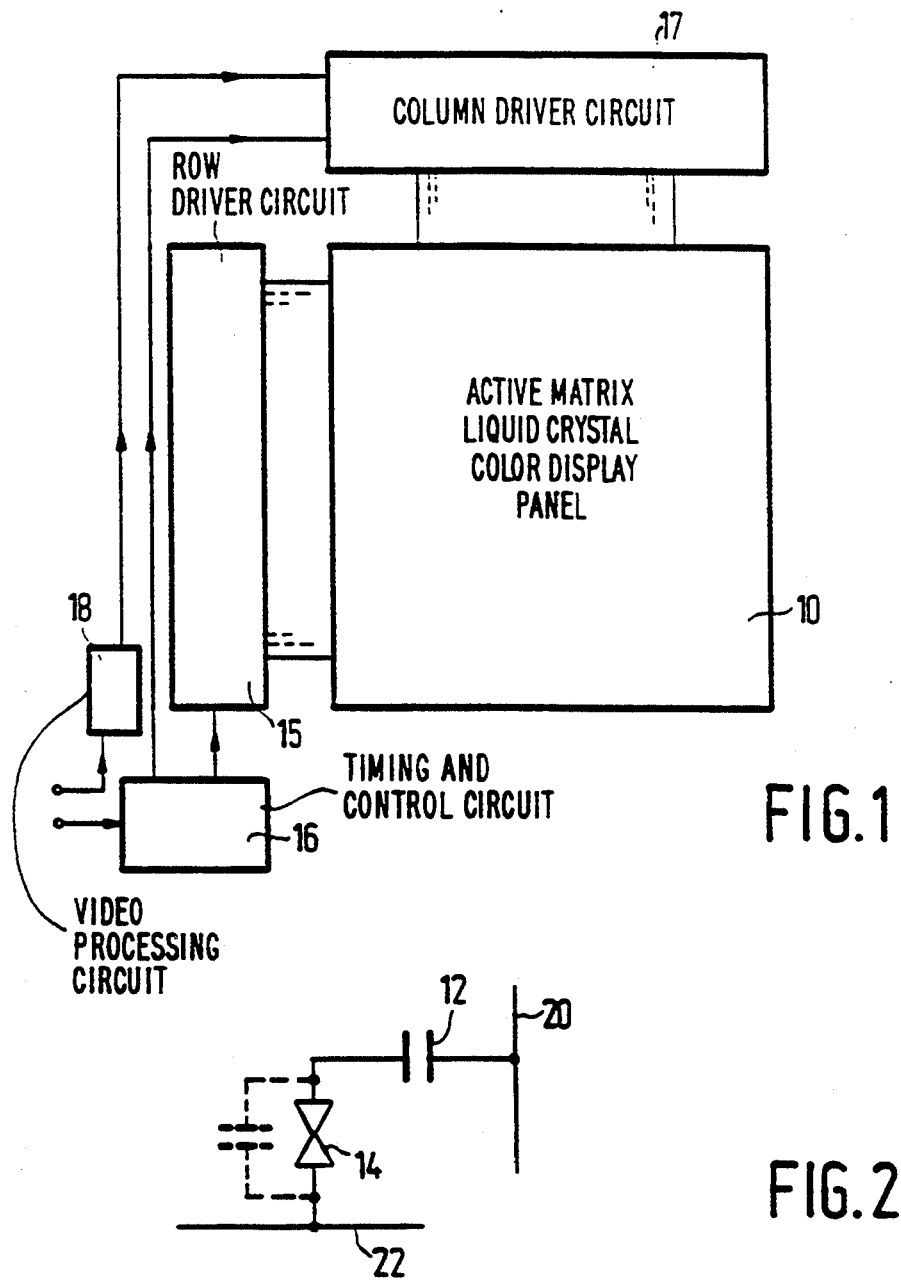
FIG.1
FIG.2
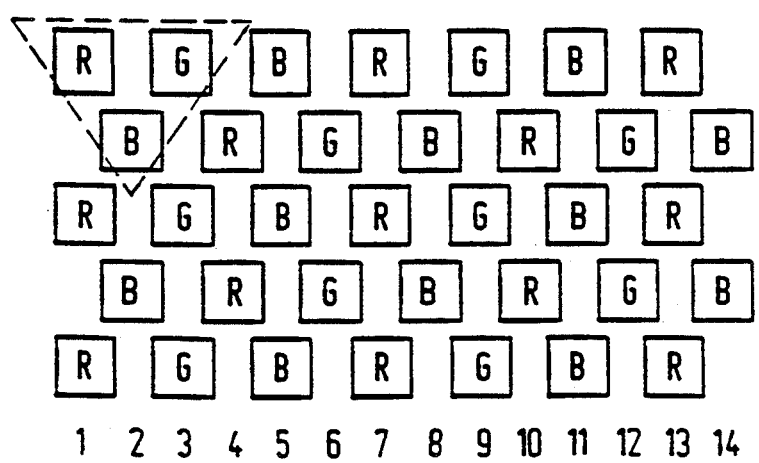
FIG.3

LIQUID CRYSTAL COLOUR DISPLAY DEVICE WITH ZIG-ZAG PATTERN

BACKGROUND OF THE INVENTION

This invention relates to a liquid crystal colour display device comprising liquid crystal picture elements for displaying three different colours which are arrayed in rows and columns with each column comprising picture elements associated with a respective colour, in which the picture elements are each associated with a respective switching element and are driven via first and second sets of address conductors which cross one another with each row of picture elements being connected with a respective address conductor of the first set and with each address conductor of the second set being connected with a respective picture element in each row and associated with picture elements of more than one colour.

Display devices of this kind are known, for example from EP-A-0244013, and can be used for displaying alpha-numeric or video, e.g. T.V. information. The switching elements may comprise three terminal devices, such as TFTs, or two terminal, non-linear, devices of various forms such as MIMs, back to back diodes, diode rings etc. The picture elements are driven a row at a time by applying scanning signals to each of the first set of address conductors in sequence and synchronised data signals to the address conductors of the other set. The polarity of the drive voltages applied to the picture elements is periodically inverted, in accordance with standard practice, in order to improve display quality.

For visual perception considerations, the lay-out of the colour picture elements is preferably in a so-called delta configuration in which the filter elements are arranged in a triangular pattern. Examples of delta-configuration display devices are described in EP-A-0244013, using TFTs, and in the paper entitled "A 1.7 M Pixel Full-Colour Diode Driven AM-LCD" by M. Vijan et al in SID 90 Digest at pages 530 to 533, using two terminal switching devices. The picture element lay-out is such that each row of picture elements consists of a repeating R (red), G (green) and B (blue) picture element sequence with the picture elements of one row being shifted relative to those of a juxtaposed row by half a period. A display colour triad, or triplet, may then be obtained comprising a triangular group of three picture elements, R, G and B, in which two of the colour picture elements, e.g. R and G are juxtaposed in the same row, and the third element, B, lies in the juxtaposed row of picture elements mid-way below the R and G elements with each row of colour triads therefore being constituted by two rows of picture elements. As described in EP-A-0244013 a column address conductor can be used, and shared, by two adjacent columns of picture elements, comprising, for a column of triads, one of the two picture elements in one row and the third picture element in the juxtaposed row, and each individual column conductor is associated with picture elements of two colours. A similar delta configuration of picture elements may be used also in a display device in which each colour triad is constituted by three adjacent picture elements, one of each colour, in the same row. This has the advantage over the previous arrangement in that a row of colour points can be addressed via a single row conductor rather than two row conductors, but has the disadvantage of reduced horizontal resolution.

In actively-addressed display devices using two or three terminal non-linear devices the capacitance of these active devices can couple part of the data signal applied to a column address conductor onto a picture element when the active device associated with that picture element is in its off-state. If the capacitance of an active device is sufficiently large in relation to the capacitance of the picture element then the amplitude of the signal coupled onto the picture element will produce vertical cross-talk effects whereby the voltage on the picture element, and hence its transmission, is altered by data signal voltages intended for other picture elements associated with the same column conductor. Usually, this effect is greatest if field rate inversion of the column, data, signal is used, but can be reduced in certain kinds of display devices if a line rate inversion drive scheme, intended to eliminate flicker effects, is employed in which the column signal is inverted every line which can result in the effect of capacitive coupling on the rms voltage of the picture element, and hence the effect on its transmission, being reduced. However, the use of this line inversion drive scheme in overcoming problems with cross-talk has limitations. In particular, it is less effective in colour display devices having colour (R,G,B) picture elements arranged in delta configuration of the known kind. Due to the configuration of colour picture elements in relation to respective column conductors significant vertical cross-talk can still occur even if line rate inversion is used.

It is an object of the present invention to provide liquid crystal colour display device in which vertical cross-talk effects are reduced.

It is another object of the present invention to provide a liquid crystal colour display device having a delta configuration of colour picture elements and driven using a line inversion drive scheme which exhibits a reduction in vertical cross-talk effects.

SUMMARY OF THE INVENTION

According to the present invention, there is provided a liquid crystal colour display device of the kind as described in the opening paragraph which is characterised in that each address conductor of the second set is connected with respective picture elements in at least three successive columns. With the address conductor of the second set carrying data signals therefore, each such address conductor carries data signals for picture elements of all three colours in contrast with known display devices having a delta configuration of picture elements in which each address conductor of the second set carries signals for picture elements of just two colours. Unlike the latter arrangement, in which for certain kinds of display patterns, particularly displays involving areas of primary colours against a grey background, the data signals applied to an address conductor can lead to significant vertical cross-talk when a line inversion drive scheme is employed, a display device according to the invention exhibits less vertical cross-talk when such display patterns are being displayed. A delta configuration display device can then be driven using line inversion to reduce flicker effects while at the same time demonstrating less vertical cross-talk than with known display devices when displaying commonly occurring patterns otherwise likely to cause such cross-talk. This results from a change in the nature of the signals in the address conductors of the second set. As a consequence of each such address conductor being associated with picture elements in three or more successive columns, and hence picture elements of all three colours, the signals on the address conductors over a given period are of alternating polarity such that effects of vertical cross-talk on picture element transmission characteristics, dependent on applied rms voltages, become less significant. The extent by which vertical cross-talk effects are reduced increases in accordance with an increase in the number of columns with which an address conductor of these second set is associated. This follows from the fact that as the number of columns with which each address conductor is associated increases, then the positive and negative polarity signals on an address conductor will tend towards equal amounts of time over a given period. Thus a display device in which each such address conductor is connected to picture elements of four successive columns will show less vertical cross-talk than one in which the address conductor is connected with picture elements of only three successive columns, and so on.

Preferably, the address conductors of the second set are connected to a column driver circuit which is operable to sample video lines of an applied video signal and apply data signals obtained by said sampling to the address conductors with the timing of the sampling operations of the column driver circuit relative to the start of the video lines being shifted from line to line by a predetermined amount. In this way horizontal resolution can be maintained using a standard kind of column driver circuit requiring only minor modification.

In order to allow connection with picture elements of three or more columns, each address conductor in practice is preferably of zig-zag form such that it extends in a first direction to connect with the picture elements in three or more successive columns, one in each row, before changing direction so as to connect with further picture elements in the same columns but in succeeding rows, and then repeating this pattern. The zig-zag nature of this address conductor consequently requires that some additional conductors be provided to address picture elements located immediately adjacent opposing sides of the display array if these picture elements are to be used for display purposes but the number required is insignificant.

In a preferred embodiment, address conductors of the second set are each connected to picture elements in seven successive columns. A signal on an address conductor is then an alternating polarity signal with substantially equal periods in both states when averaged over for example a field period, i.e. positive for approximately 50% of the time and negative for the remainder of the time, for all areas of primary colours, complementary colours and shades of grey while the number of additional conductors necessary is kept to a minimum.

The invention can be applied to display devices in which the switching elements comprise two or three terminal devices.

BRIEF DESCRIPTION OF THE DRAWINGS

Liquid crystal colour display devices in accordance with the present invention will now be described, by way of example, with reference to the accompanying drawings, in which:

FIG. 1 is a simplified schematic block diagram of an embodiment of display device according to the invention;

FIG. 2 illustrates the circuit of a typical picture element of the display device and its associated switching element, in this case a two terminal non-linear device;

FIG. 3 illustrates the pattern in which colour picture elements of the display device are arranged;

It should be understood that the Figures are merely schematic and are not drawn to scale. It should also be understood that the same reference numerals are used throughout the Figures to indicate the same or similar parts.

DESCRIPTION OF THE PREFERRED EMBODIMENT

Figure 4:
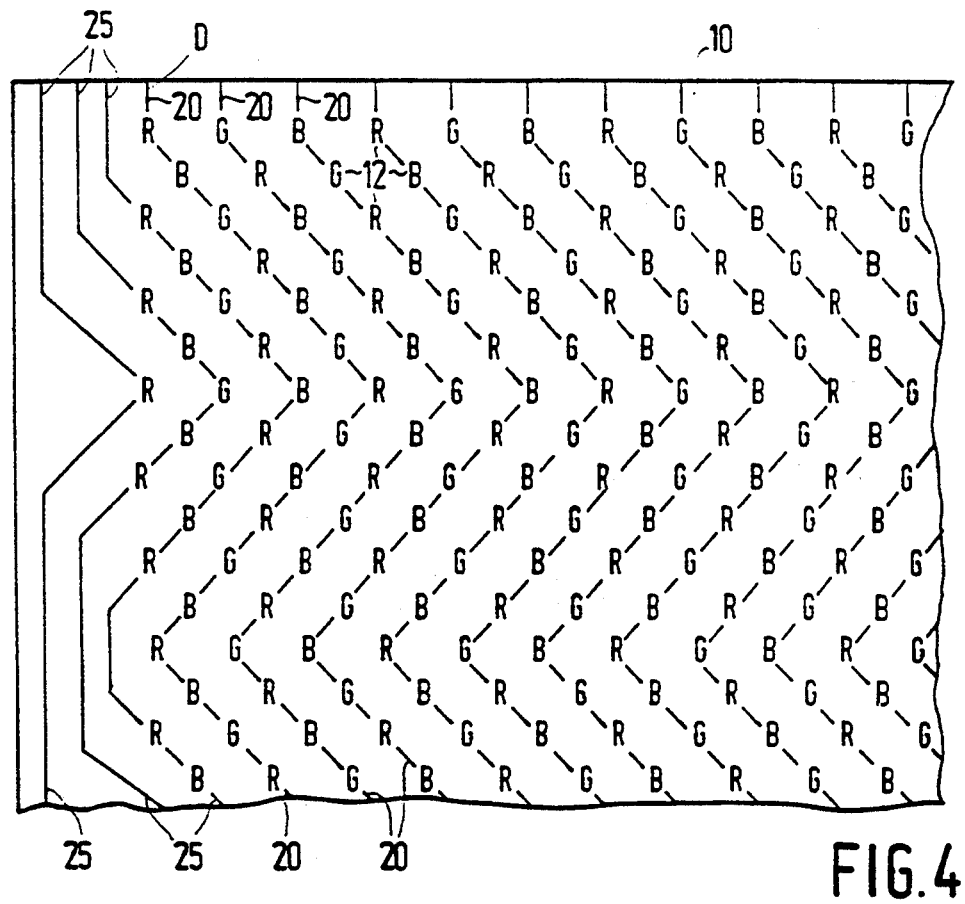
FIG. 4 illustrates one embodiment of picture element interconnection scheme of the display device according to the invention.

Referring to FIG. 1, the display device, which is intended to display video, for example TV, pictures includes an active matrix liquid crystal colour display panel 10. The panel 10, which operates in transmissive mode, comprises two spaced, transparent and insulating supporting plates, for example of glass, with twisted nematic liquid crystal disposed therebetween and has a large number, typically a few hundreds of thousands, of liquid crystal picture elements with associated switching elements arranged in rows and columns and which are addressed via first and second sets of crossing address conductors with each picture element being connected with a respective address conductor of each set. The first set comprises row address conductors extending in the row direction. Conductors of the second set extend generally in the column direction and hereinafter will be referred to as column address conductors for simplicity. Picture elements in a row are connected with respective one of the row address conductors. Each column address conductor is connected with a respective picture element in each row.

In common with known active matrix liquid crystal display devices, the row address conductors serve as scanning electrodes and are controlled by a row driver circuit 15, comprising a shift register circuit, which applies a selection signal to each row conductor sequentially in turn during a respective row address period. In synchronism with the selection signals, achieved by means of the timing and control circuit 16, data (video) signals, obtained by sampling a TV line with serial to parallel conversion, are applied to the column address conductors from a column driver circuit 17 connected to the output of a video processing circuit 18 to produce a required display effect from the rows of picture elements as they are scanned. The individual display effects of the picture elements, addressed one row at a time, combine to build up a complete picture in one field, the picture elements being addressed again in a subsequent field.

The switching elements in this embodiment comprise two terminal, bidirectional, non-linear resistance devices, for example MIMs, diode rings or back to back diodes. The circuit of a typical picture element is illustrated in FIG. 2. The picture element, referenced 12, is connected in series with the non-linear device, 14, here a MIM, between a column address conductor and a row address conductor, referenced 20 and 22 respectively.

As in known display devices, the set of row address conductors 22, the devices 14, and first, generally rectangular, electrodes of the picture elements 12 are all carried on one of the supporting plates of the display panel while the set of column address conductors 20 of strip shape are carried on the other plate with the picture element second electrodes being constituted by respective portions of the column address 8 PI-IB 33748 EP conductors overlying the picture element first electrodes. In an alternative configuration, the devices 14 and picture element first electrode may be carried on the same plate as the set of column address conductors, with the row address conductors then being provided as strip shape conductors on the other plate to constitute the picture element second electrodes.

Liquid crystal display devices using two terminal non-linear devices as switching elements are generally well known and for further information reference is invited, for example, to U.S. Pat. Nos. 4,223,308 and 4,413,883, whose disclosures are incorporated herein by reference.

The voltage/conduction characteristic of the two-terminal non-linear devices 14 is substantially symmetrical with respect to zero voltage and so by reversing the polarity of the scanning and data signal voltages periodically a net dc bias across the picture elements can be avoided. This inversion may be carried out after every line or every field, commonly referred to as, respectively, line inversion and field inversion. Each time a picture element is addressed, in successive fields, the polarity of the applied voltage is reversed.

To obtain a full colour display the display panel 10 further includes in a known manner a micro-filter array consisting of red, green and blue filter elements corresponding with the array of picture elements such that individual picture elements produce a respective colour output. The picture elements are arranged in a delta configuration in which a row of picture elements is shifted half a period in the row direction with respect to the preceding and succeding rows of pictures as depicted in FIG. 3 which illustrates a representative part of the picture element array and in which individual colour picture elements 12 are represented by boxes labelled R (red), G (green) and B (blue). It is apparent that individual columns of picture elements comprise picture elements of the same colour, there being parts of fourteen such columns of picture elements shown in FIG. 3 comprising from the left, R, B, G, R, B, G, R, B, G, R, B, G, R and B picture elements respectively. Triangular groups of R, G and B picture elements, one of which is shown in dashed outline, constitute colour triads or triplets. Alternatively, however, colour triplets could be constituted by groups of three adjacent R, G and B elements in the same row.

Each row of picture elements is connected with a respective row address conductor 22 as in known delta configuration display devices. However, unlike these known devices in which each column conductor is associated with just two adjacent columns of picture elements, each column address conductor 20 in the display device of FIG. 1 is connected with picture elements in at least three successive columns. In a preferred embodiment, each column address conductor is connected with picture elements in seven successive columns. The interconnection arrangement of the column address conductors with respective picture elements 12 in this preferred embodiment is illustrated in FIG. 4 which represents a portion of the row and column array of picture elements, here represented simply by the letters R, G and B, comprising parts of the first sixteen rows adjacent one side of the display panel 10. It can be seen that a typical column address conductor 20 connects with one picture element in each row and follows a zig-zag path in a generally vertical direction so as to extend across, and connect with picture elements in, seven successive columns before changing direction and connecting with other picture elements in the same seven columns. Each column conductor 20 is therefore associated with all three colours of picture elements, rather than just two colours as in the known devices. This interconnection scheme means that a few additional column conductors, five in this embodiment and referenced at 25, are required to address certain picture elements in a first few columns of picture elements at the edge of the array if these first few columns are to be used for display purposes. Similarly, additional column conductors will be required at the opposite edge of the array. The number of extra column conductors necessary compared to the total number of columns of picture elements in the array, typically 480 or more, is therefore insignificant.

In order to maintain the horizontal resolution of the display device, the timing of the sampling in the column driver circuit 17 is shifted from line to line. For example, for the arrangement of FIG. 4, the sampling for the column conductor 20 labelled D relative to the start of the picture information is shifted by multiples of T where T is half the time period between samples for adjacent picture elements in the same row according to the following table:

| Row No. | 1 | 2 | 3 | 4 | 5 | 6 | 7 | 8 | 9 | 10 | 11 | 12 | 13 |
|---|---|---|---|---|---|---|---|---|---|---|---|---|---|
| Column D sample | 0 | T | 2T | 3T | 4T | 5T | 6T | 5T | 4T | 3T | 2T | T | 0 |

This kind of sampling adjustment is used, although to a lesser extent, for the known form of delta configuration display device and is achieved using additional digital circuitry in the column driver circuit or its control circuit. The driver circuit 17 required for the display device can be obtained in similar manner.

The display device of FIGS. 1 to 4 allows a single line inversion drive scheme to be used, which is preferable as it leads to a reduction in display flicker effects compared with a field inversion drive scheme, while at the same time avoiding problems with vertical cross-talk. The reasons for this will now be discussed.

The capacitance of the active devices 14 can couple part of the column conductor signal onto the picture element when the active device 14 is in the off-state. Referring to the circuit shown in FIG. 2 it can be seen that if the picture element, 12 capacitance is $C_{LC}$ and the capacitance of the MIM 14, represented in dotted outline, is $C_X$ then the amplitude, $V_X$, of the signal coupled onto the picture element 12 if the amplitude of the column signal is $V_C$ will be:

$$V_X = V_C \cdot \frac{C_X}{(C_X + C_{LC})} \quad (1)$$

Figure 5:
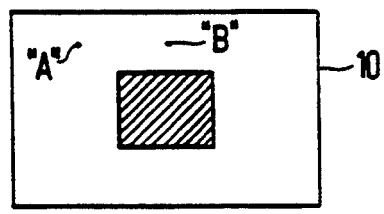
FIG. 5 shows a typical kind of display pattern.
Figure 6:
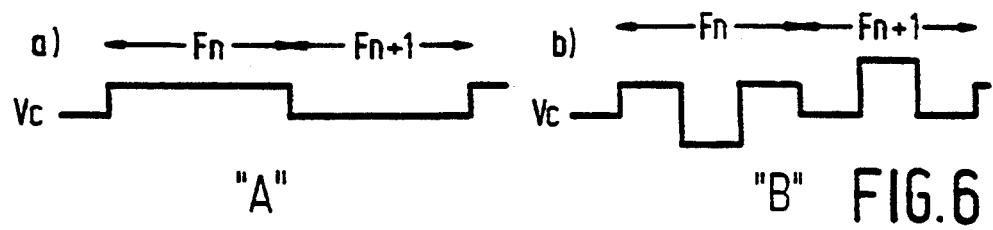
FIGS. 6a–b and 7a–b show examples of column conductor and picture element voltage waveforms respectively in a known kind of display device in the case of a display pattern of FIG. 5.
Figure 7:
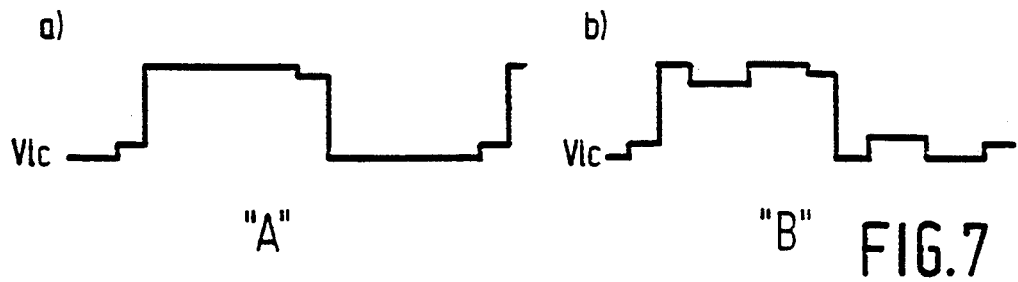

If the ratio $C_X/C_{LC}$ is larger than about 0.1 then $V_X$ can be large enough to produce vertical cross-talk effects, that is, the voltage on the picture element (and hence its transmission) is altered by voltages intended for other picture elements connected to the same column conductor. This effect is greatest if field rate inversion of the column conductor signal is used. To illustrate this, consideration will be given for simplicity to a conventional monochrome display device, in which each row of picture elements is connected with a respective row address conductor and each column of picture elements is connected to a respective column address conductor. FIG. 5 shows an example display pattern from such a device having a grey field with a black square in the centre. FIGS. 6a and 6b show the column conductor signals, Vc, for columns containing the picture elements marked A and B in FIG. 5 over two field periods, Fn and Fn+1. FIGS. 7a and 7b show picture element voltages, $V_{LC}$, for picture elements A and B. The column signals coupled onto the picture elements via $C_X$ are different for A and B and produce different rms voltages and hence different transmissions of the two picture elements. This means that the grey areas above and below the black square have different brightnesses than similar grey areas elsewhere in the picture.

Figure 8A:
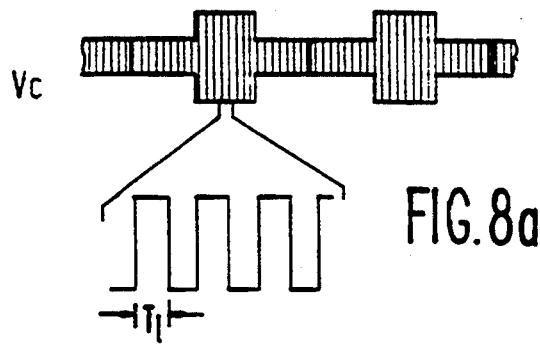
FIGS. 8a and 8b show examples of typical column conductor and picture element voltages respectively in the known kind of display device when using an alternative drive scheme.
Figure 8B:
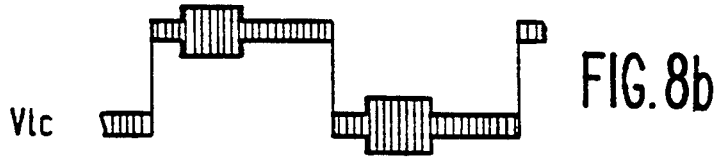

This effect can be minimised by using line rate inversion where the column signal is inverted every line. With line rate inversion the column signal and the picture element voltage corresponding to picture element B in FIG. 5 are as shown in FIGS. 8a and 8b respectively for two complete fields. ($T_1$ indicates one row period). The coupling of the column signal onto the picture element still occurs but the effect on the rms voltage, and hence on the picture element transmission, is much smaller.

Figure 9A:
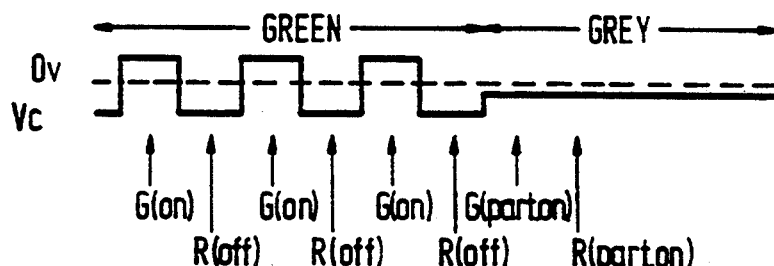
FIGS. 9a and 9b show respectively examples of column conductor voltages in the case of a known display device having a delta picture element configuration and using alternative drive schemes.
Figure 9B:
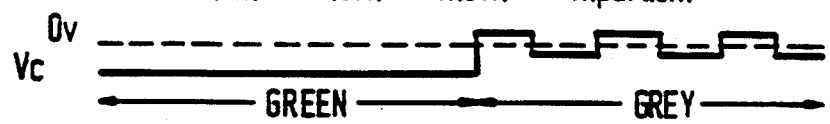

However, a problem arises in delta configuration display devices. With the column conductors connected to the picture elements in known manner in which each column conductor is associated with only 2 of the 3 colours and with every other row conductor having the same colour associated with it the sequences of coloured picture elements along the column conductors are RBRBRB etc., GRGRGR etc., and BGBGBG etc. If a display pattern like that shown in FIG. 5 but with the central black area consisting of a plain primary colour, e.g. green, is displayed then vertical cross-talk occurs even if line rate inversion is used. The reason for this is illustrated in FIG. 9 which shows examples of the column conductor signal for a column conductor associated with red and green picture elements and thus having a GRGRGR etc., colour sequence when displaying green and grey areas. FIG. 9a illustrates the case for a field inversion drive scheme and FIG. 9b illustrates the case for a line inversion drive scheme. Considering the example of a pattern like that shown in FIG. 5 with a grey background but with a pure green square in the centre instead of a black one, the signal applied to the column conductors to produce the green part of the image will be as follows:

| Column N: | RBRBRBRB | Off | Off | Off | Off | Off | ... |
|---|---|---|---|---|---|---|---|
| Column N + 1: | GRGRGRGR | On | Off | On | Off | On | ... |
| Column N + 2: | BGBGBGBG | Off | On | Off | On | Off | ... |

If these signals are now inverted at line rate the resulting column signal for columns type N+1 & N+2 will be like field inversion signals for plain fields since the signal for every row is inverted and an inverted "on" signal is the same as an "off" signal. The signal on column N+1 for a part of the image containing both green and grey areas is shown in FIGS. 9a and 9b for field and line inversion respectively. In the green part of the image the line inversion signal causes exactly the same cross-talk effects as shown in FIGS. 6b and 7b for field inversion in a monochrome display and can degrade the picture quality significantly (unless the capacitance ratio $C_X/C_{LC}$ is very low, e.g. less than 0.1, which is difficult to achieve in some types of display).

The manner of interconnection of the column conductors 20 to picture elements 12 depicted in FIG. 4 overcomes the problems described by allowing single line inversion to be used while avoiding vertical cross-talk. The column conductors zig-zag from side to side in such a way that for all commonly occurring display patterns the signal on the column conductors in line inversion drive is of alternating polarity. The preferred arrangement shown in FIG. 4 meets the requirement of providing an alternating column conductor signal with equal periods over a given time in both polarity states for all areas of primary colours, complementary colours and shades of grey, while minimising the number of additional column conductors which have to be provided.

As an example of how this arrangement avoids cross-talk consider the column conductor signal for a plain green field with a line inversion drive scheme for each of 3 adjacent column conductors. In this case, the polarity of non-inverted white and inverted black signals is positive. At the end of these sequences the signals repeat in the same way.

| Column N | R | B | G | R | B | G | R | G | B | R | G | B |
|---|---|---|---|---|---|---|---|---|---|---|---|---|
| Picture Element | Off | Off | On | Off | Off | On | Off | On | Off | Off | On | Off |
| Inversion | + | − | + | − | + | − | + | − | + | − | + | − |
| Column Conductor Signal | − | + | + | + | − | − | − | − | + | + | + | + |

| Column N + 1 | G | R | B | G | R | B | G | B | R | G | B | R |
|---|---|---|---|---|---|---|---|---|---|---|---|---|
| Picture Element | On | Off | Off | On | Off | Off | On | Off | Off | On | Off | Off |
| Inversion | + | − | + | − | + | − | + | − | + | − | + | − |
| Column Conductor Signal | + | + | − | − | − | + | + | + | − | − | − | + |

| | | | | | | | | | | | | |
|---|---|---|---|---|---|---|---|---|---|---|---|---|
| | | | | | | -continued | | | | | | |
| Column N + 2 | B | G | R | B | G | R | B | R | G | B | R | G |
| Picture Element | Off | On | Off | Off | On | Off | Off | Off | On | Off | Off | On |
| Inversion | + | − | + | − | + | − | + | − | + | − | + | − |
| Column Conductor Signal | − | − | − | + | + | + | − | + | + | + | − | − |

It can be seen that for all column conductors the signal is positive and negative for equal amounts of time. When averaged over one field period, therefore, the column signal is positive for 50% of the time and negative for 50% which is the requirement for minimising vertical cross-talk.

This column conductor interconnection arrangement also has the advantage that it avoids other problems like increased length (and hence resistance) of the column conductors or lower picture element apertures when compared to the known arrangement since in passing from one row to the next, tile column conductor always shifts just half a picture element left or right, as apparent from FIG. 3.

Figure 10A:
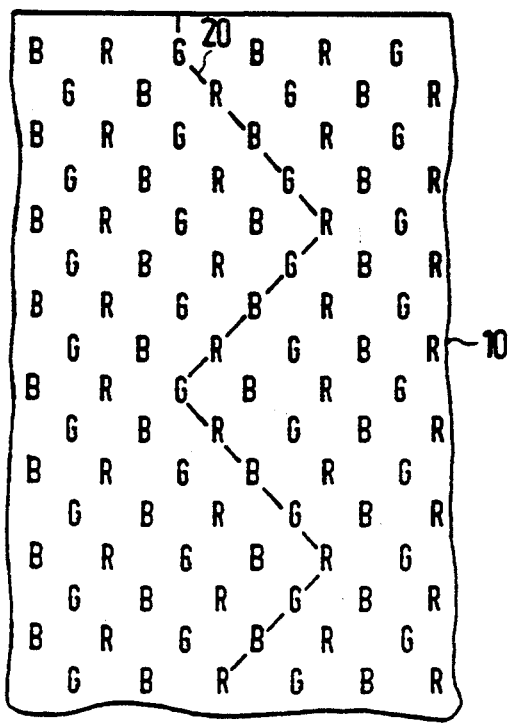
FIGS. 10a and 10b illustrate further embodiments of picture element interconnection schemes of the display device according to the invention.
Figure 10B:
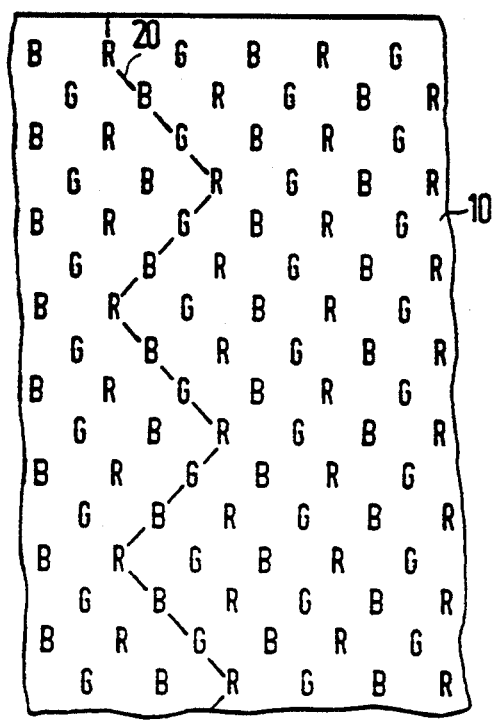

In other embodiments of the invention, each column conductor may be connected with picture elements of more than two columns but less than seven columns. FIGS. 10a and 10b illustrate two such examples, in which each column conductor 20 (only one of which is depicted) zig-zags between five (FIG. 10a) and four (FIG. 10b) successive columns of picture elements. In fact, the amount by which vertical cross-talk is reduced increases in accordance with the number of columns of picture elements to which each column conductor is connected. Arrangements such as these in which the column conductors extend sideways in one direction by fewer than seven picture element columns before reversing direction provide improvements in vertical cross-talk when employing a line inversion drive scheme which are intermediate those of the known interconnection arrangement and the arrangement of FIG. 4. Unlike the former, they do not produce column signals with all polarities the same for plain colour displays but the fraction of the time for one field for which a column conductor in positive and negative is not 50% and is different for different column conductors. For example, for the arrangement of FIG. 10b the signal on the column conductor shown when displaying purely green would be positive for 83% of the time and negative for the remaining 17% of the time when averaged over one field period, whereas, for the arrangement of FIG. 10a the signal on the column conductor shown when displaying purely blue would be positive for 75% of the time and negative for 25% of the time.

Each column conductor could alternatively be connected to more than seven successive columns of picture elements. However, there would be little advantage to be gained in terms of vertical cross-talk improvement and a greater number of additional column conductors would be required.

While the described embodiments concern liquid crystal colour display devices using two terminal non-linear resistance devices as switching elements, the invention is applicable also, with similar benefits, to display devices in which the switching elements comprise TFTs. These types of display devices can similarly suffer from vertical cross-talk problems as a result of source/drain capacitance coupling in the switching elements. Of course, in such display devices the first and second (row and column) sets of address conductors are provided, together with the TFTs, on the same supporting plate and a common electrode is carried on the opposing plate. The column conductor/picture element interconnection scheme follows that described previously, e.g. as depicted in FIG. 4 or FIGS. 10a and 10b.

I claim:

1. A liquid crystal colour display device comprising liquid crystal picture elements for displaying three different colours which are strayed in rows and columns with each column comprising picture elements associated with a respective colour, in which the picture elements are each associated with a respective switching element and are addressable via first and second sets of address conductors which cross one another with each row of picture elements being connected with a respective address conductor of the first set and with each address conductor of the second set being connected with a respective picture element each row and associated with picture elements of more than one colour, characterised in that each address conductor of the second set is connected with respective picture elements in at least three successive columns.

2. A liquid crystal colour display device according to claim 1, characterised in that each address conductor of the second set is connected with respective picture elements in seven successive columns of picture elements.

3. A liquid crystal colour display device according to claim 1, characterised in that the display device includes a drive circuit connected to the first and second sets of address conductors and arranged to drive the picture elements using a line inversion drive scheme.

4. A liquid crystal colour display device according to claim 1, characterised in that the address conductors of the second set are connected to a column driver circuit which is operable to sample video lines of an applied video signal and apply data signals obtained by said sampling to the address conductors with the timing of the sampling operations of the column driver circuit relative to the start of the video lines being shifted from line to line by a predetermined amount.

5. A liquid crystal colour display device according claim 1, characterised in that the switching elements comprise two terminal non-linear devices connected in series with the picture elements between associated address conductors of the first and second sets.

6. A liquid crystal colour display device according to claim 1, characterised in that the switching elements comprise TFTs each of which is connected to a respective picture element and to respective address conductors of the first and second sets.

7. A liquid crystal colour display device according to claim 2, characterised in that the display device includes a drive circuit connected to the first and second sets of address conductors and arranged to drive the picture elements using a line inversion drive scheme.

8. A liquid crystal colour display device according to claim 2, characterised in that the address conductors of the second set are connected to a column driver circuit which is operable to sample video lines of an applied video signal and apply data signals obtained by said sampling to the address conductors with the timing of the sampling operations of the column driver circuit relative to the start of the video lines being shifted from line to line by a predetermined amount.

9. A liquid crystal colour display device according to claim 3, characterised in that the address conductors of the second set are connected to a column driver circuit which is operable to sample video lines of an applied video signal and apply data signals obtained by said sampling to the address conductors with the timing of the sampling operations of the column driver circuit relative to the start of the video lines being shifted from line to line by a predetermined amount.

10. A liquid crystal colour display device according to claim 2, characterised in that the switching elements comprise two terminal non-linear devices connected in series with the picture elements between associated address conductors of the first and second sets.

11. A liquid crystal colour display device according to claim 3, characterised in that the switching elements comprise two terminal non-linear devices connected in series with the picture elements between associated address conductors of the first and second sets.

12. A liquid crystal colour display device according to claim 4, characterised in that the switching elements comprise two terminal non-linear devices connected in series with the picture elements between associated address conductors of the first and second sets.

13. A liquid crystal colour display device according to claim 2, characterised in that the switching elements comprise TFTs each of which is connected to a respective picture element and to respective address conductors of the first and second sets.

14. A liquid crystal colour display device according to claim 3, characterised in that the switching elements comprise TFTs each of which is connected to a respective picture element and to respective address conductors of the first and second sets.

15. A liquid crystal colour display device according to claim 4, characterised in that the switching elements comprise TFTs each of which is connected to a respective picture element and to respective address conductors of the first and second sets.

* * * * *